United States Patent [19]

Sakai et al.

[11] Patent Number: 4,770,889
[45] Date of Patent: Sep. 13, 1988

[54] SWEETENER

[75] Inventors: Keiichi Sakai; Yuzo Okada; Koichi Takizawa, all of Kawasaki, Japan

[73] Assignee: Ajinomoto Co., Inc., Tokyo, Japan

[21] Appl. No.: 26,306

[22] Filed: Mar. 16, 1987

[30] Foreign Application Priority Data

Mar. 25, 1986 [JP] Japan .................................. 61-66179

[51] Int. Cl.$^4$ ............................................. A23L 1/236
[52] U.S. Cl. ...;.............................. 426/548; 426/804
[58] Field of Search ......................................... 426/548

[56] References Cited

U.S. PATENT DOCUMENTS

| | | | |
|---|---|---|---|
| 4,208,431 | 6/1980 | Friello et al. .................. | 426/548 X |
| 4,346,116 | 8/1982 | Verwaerde et al. ............. | 426/548 X |
| 4,357,354 | 11/1982 | Kehoe et al. .................. | 426/548 X |
| 4,374,858 | 2/1983 | Glass et al. .................... | 426/548 X |
| 4,497,846 | 2/1985 | Bousier et al. ................. | 426/548 X |
| 4,556,565 | 12/1985 | Arima et al. .................... | 426/548 X |
| 4,597,970 | 7/1986 | Sharma et al. .................. | 426/548 X |
| 4,722,844 | 2/1988 | Ozawa et al. ................... | 426/548 X |

Primary Examiner—Joseph Golian
Attorney, Agent, or Firm—Oblon, Fisher, Spivak, McClelland & Maier

[57] ABSTRACT

Sweetners and sweetened foods are disclosed which comprise aspartame (APM) and sugar alcohols in the following ratio:

| | |
|---|---|
| (1) Sorbitol | 1 to 10 wt % |
| (2) Martitol | 45 to 55 wt % |
| (3) Other oligosugar alcohols | 35 to 55 wt % |
| (4) Ratio of sweetness | APM: Sugar alcohols (1)-(3)= 9.5:0.5 to 3:7 |

The sweeteners and sweetened foods can be table sugars, frozen sweets, cookies, fermented milks or beverages, such as soda pops and carbonated cola drinks, and have a sweetness similar to sucrose.

1 Claim, No Drawings

SWEETENER

BACKGROUND OF THE INVENTION

1. Field of the Invention

The present invention relates to a sweetener or a sweetened food which comprises aspartame. More particularly, it relates to a sweetener or a sweetened food which comprises aspartame and sugar alcohols.

2. Description of the Prior Art

Of known low caloric sweetening agents, aspartame is characterized as a sweetener possessing a clear pleasant sweetness and is free from bitter aftertaste. It is however undeniable that the sweetness of aspartame is not satisfactorily rich in mouthfulness, and that it has a tendency to leave a lingering taste characteristic of sweetening agents having a high sweetening potency.

Such characteristics of aspartame are recognized not only in cases where it is used alone but also in cases where it is used in combination with other flavoring or fragrant substances. In particular, such characteristics tend to be strengthened when it is added as a table sweetener to coffee, tea, etc., or when it is incorporated into such beverages as soda pops and carbonated cola beverages, of which sweetness and fragrance are directly tasted.

In order to improve the quality of its sweetness, aspartame has hitherto been used in combination with various substances, including, e.g., aluminum sulfate and potassium naringin [Japanese Patent Application (Laid Open) No. 90,667/77]; sodium L-glutamate [Japanese Patent Application (Laid Open) No. 148,255/81]; glycine, alanine and serine [Japanese Patent Application (Laid Open) No. 63,068/82]; sucrose [Japanese Patent Application (Laid Open) No. 155,965/82]; L-ascorbic acid [Japanese Patent Application (Laid Open) Nos. 141,760/83 and 19,474/85]; starch syrup, dextrin and glucose [Japanese Patent Application (Laid Open) Nos. 114,167/85, 114,169/85 and 114,168/85]; and the like.

However, it could hardly be said that these prior arts have fully succeeded in improving the sweetness of beverages, etc. to a level comparable to sucrose.

It is therefore an object of the present invention to provide a sweetener or a sweetened food which is free from the above disadvantages of aspartame.

It is another object of the present invention to provide a sweetener, in particular, table sugar having a mild and pleasant sweetness comparable to sucrose.

It is a further object of the present invention to provide a food, in particular, a carbonated beverage imparted with sweetness which is not disagreeable to consumers accustomed to the taste of sucrose.

Other objects of the present invention will become apparent from the following description.

DESCRIPTION OF THE INVENTION

In view of the above, the inventors have conducted intensive investigations for the improvement of the quality of sweetness of aspartame. As a result, it has now been found that the sweetness of aspartame can be markedly improved by using aspartame in combination with sugar alcohols in particular ratios.

Accordingly, there is provided by the present invention a sweetener or a sweetened food comprising, in addition to aspartame, (1) sorbitol, (2) maltitol and (3) "other oligosugar alcohols" in the following ratio:

| | |
|---|---|
| (1) Sorbitol | 1 to 10% |
| (2) Maltitol | 45 to 55% |
| (3) "Other oligosugar alcohols" | 35 to 55% |

As "other oligosugar alcohols", there can be used sugar alcohols containing more than 2 sugar units. It is preferable to use a mixture of oligosugar alcohols consisting of 50 to 60% of sugar alcohols containing 3 to 6 sugar units and 40 to 50% of sugar alcohols containing more than 6 sugar units.

When used in combination with aspartame, sorbitol is capable of imparting an agreeable initial taste, and "other oligosugar alcohols" are capable of enriching the sweetness of aspartame. However, these effect are not at all strong. On the other hand, maltitol exhibits little effects on the improvement of the sweetness of aspartame when it is used alone. In spite of these facts, maltitol is capable of improving the sweetness of aspartame when used in combination with sorbitol and "other oligosugar alcohols" in particular ratios. That is to say, sorbitol, maltitol and "other sugar alcohols" are little or only sightly effective in improvement of the quality of sweetness of aspartame when they are used individually, but the sweetness of aspartame can be markedly improved by using the three components together with aspartame in particular ratios described hereinabove.

If the ratio of sorbitol to the total weight of the sugar alcohols is less than 1%, the initial taste of the resulting sweetener becomes insufficient. When said "other oligosugar alcohols" are contained therein in an amount of less than 35% by weight, the resulting sweetener lacks the rich sweetness of aspartame. On the other hand, if the content of sorbitol exceeds 10% by weight or the content of "other oligosugar alcohols" exceeds 55% by weight, the desired synergistic improvements in the quality of sweetness of aspartame could not be fully attained because of the lowering of the maltitol content. Accordingly, these three components must be contained in the following percentage (based on the total weight of sugar alcohols): sorbitol, 1 to 10%; maltitol, 45 to 55%; and "other oligosugar alcohols", 35 to 55%.

The sugar alcohols are used in such an amount that the ratio of the combined sweetness of the sugar alcohols to aspartame is in the range of 0.5:9.5 to 3:7. When the ratio is 0.5 or less, the quality of the sweetness of aspartame could not be improved substantially. When it is more than 7, the clear and sharp sweetness characteristic of aspartame disappears and an undesirably flat sweetness results.

The sweetener according to the present invention can be in various forms, including liquid, tablets, granules, powders, etc. The sweetened food according to the present invention can be in the form of beverages, frozen sweets, cookies, fermented milks, and the like. There are no particular limitations on the forms of the sweetener and the kinds of the sweetened food. The present invention can be particularly useful as table sugars and beverages, including soft drinks, such as carbonated flavored beverages (e.g., soda pops, cola beverages, etc.), juice-containing beverages and artificial fruit-flavored beverages; lactic acid beverages; lactobacillus-containing beverages; and the like. The synergistic effects of the present invention can be markedly exhibited in carbonated flavored beverages, such as soda pops and carbonated cola beverages, which do not contain such taste-imparting ingredients as juice and lactic acid, and the taste of which is composed only of such ingredients as organic acids and aspartame.

The sweetener or sweetened food of the present invention can be used together with other ordinary raw food materials, and there are no particular restrictions on the methods to be employed for their production. The concentration of aspartame and the sugar alcohols to be contained in the sweetener or sweetened food is not limited to any particular range. It can however be generally preferable to use aspartame at a concentration of 0.01 to 0.05 g/dl and the sugar alcohols at a concentration of 1 to 20 g/dl. When aspartame is used at a concentration less than 0.01 g/dl, the desired effects of the present invention may not be attained, depending on the kinds and concentrations of other ingredients contained therein.

The combined use of aspartame, sorbitol, maltitol and "other oligosugar alcohols" in particular ratios according to the present invention makes it possible to markedly improve the quality of the sweetness of aspartame, in comparison with the cases where those sugar alcohols are used individually, or in comparison with known sweetening agents or combinations of sweetening agents. Accordingly, there can be provided by the present invention a sweetener or a sweetened food having a sweetness which is very similar to that of sucrose with regard to initial taste, richness, sustainability and aftertaste.

The present invention will further be illustrated by examples.

EXPERIMENT

Sample solutions shown in Table 1 were prepared and subjected to a sensory test of a panel of 15 members in accordance with the two point comparison method, using an aqueous 10 g/dl sucrose solution as a control. Results obtained are shown in Table 2. The quality of the sweetness of aspartame could be markedly improved in samples (in particular, in Sample 5) comprising all the three ingredients (sorbitol, maltitol and "other oligosugar alcohols"), whereas little effects could be attained in cases where only one or two of said three ingredients were employed.

TABLE 1

| Sample No. | Aspartame (AP) | Sorbitol $(HG_1)$ | Maltitol $(HG_2)$ | Other Oligo-Alcohols $(\geq HG_3)$ | $HG_1:HG_2:\geq HG_3$ (Weight Ratio) | $[AP]/[HG_1 + HG_2 + \geq HG_3]$ (Ratio of Sweetness) |
|---|---|---|---|---|---|---|
| 1 | 0.030 g/dl | 6.7 g/dl | — | — | 1:0:0 | 6/4 |
| 2 | 0.030 g/dl | — | 5.0 g/dl | — | 0:1:0 | 6/4 |
| 3 | 0.030 g/dl | — | — | 26.7 g/dl | 0:0:1 | 6/4 |
| 4 | 0.030 g/dl | 0.84 g/dl | 1.68 g/dl | 14.3 g/dl | 5:10:85 | 6/4 |
| 5 | 0.030 g/dl | 0.25 g/dl | 4.1 g/dl | 3.85 g/dl | 3:50:47 | 6/4 |
| 6 | 0.0475 g/dl | 0.03 g/dl | 0.51 g/dl | 0.48 g/dl | 3:50:47 | 9.5/0.5 |
| 7 | 0.050 g/dl | — | — | — | — | 10/0 |

Notes:
The sample solutions were so adjusted that they have a sweetness corresponding to an aqueous 10 g/dl sucrose solution.
Sorbitol $(HG_1)$ had a sweetness 0.6 times that of sucrose; maltitol $(HG_2)$, 0.8 times that of sucrose; and "other oligosugar alcohols" $(\geq HG_3)$", 0.15 times that of sucrose.

TABLE 2

| Sample No. | Initial[*1] Sweetness | Richness of[*1] Sweetness | Aftertaste[*1] | Overall[*2] Rating |
|---|---|---|---|---|
| 1 | −0.4 | −2.0 | +1.4 | 4.6 |
| 2 | −1.4 | −1.8 | +1.4 | 4.2 |
| 3 | −1.6 | −1.4 | +1.2 | 4.8 |
| 4 | −0.6 | −1.2 | +1.4 | 5.0 |
| 5 | +0.4 | +0.2 | −0.8 | 7.4 |
| 6 | −1.6 | −2.4 | +1.4 | 5.4 |
| 7 | −1.8 | −2.2 | +1.6 | 4.4 |

[*1]Rating Used:
+3 — Considerably strong
+2 — Fairly Strong
+3 — Slightly strong
0 — Equal to sucrose
−1 — Slightly weak
−2 — Fairly weak
−3 — Considerably weak
[*2]Rating Used:
10 — Best
5 — Average
0 — Poor The overall rating of the aqueous sucrose solution was 7.2. The "other oligosugar alcohols ($HG_3$ and above)" used in the above test was obtained by reducing dextrin having a DE value of about 20 and then recovering fractions of $HG_3$ and above by column chromatography.

| Conditions of Column Chromatography: | |
|---|---|
| Gel used | Toyo Pearl HW-40S by Toyo Soda Mfg. Co. |
| Eluent | $H_2O$ |
| Rate of elution | ca. 40 ml/Hr |
| Temperature | ca. 50° C. |

The composition of the oligosugar alcohols recovered by the column chromatography was analysed by high pressure liquid chromatography (HPLC). The following results were obtained: Content of $HG_3$ to $HG_9$ components, 72%; and content of the components of $HG_{10}$ and above, 28%.

| Conditions of HPLC | |
|---|---|
| Gel used | Aminex HPX-87C by Bio Rad Co. |
| Eluent | $H_2O$ |
| Rate of elution | ca. 0.6 ml/min. |
| Temperature | ca. 85° C. |

EXAMPLE 1

Carbonated Lemon Lime Beverage

Three kinds of carbonated lemon lime beverages were prepared using ingredients shown in Table 3.

TABLE 3

| Ingredients | Product of the Invention | Control Sample 1 | Control Sample 2 |
|---|---|---|---|
| Sucrose | — | 100 g | — |
| Aspartame | 0.3 | — | 0.5 |

TABLE 3-continued

| Ingredients | Product of the Invention | Control Sample 1 | Control Sample 2 |
|---|---|---|---|
| Sorbitol | 2.5 | — | — |
| Maltitol | 41.0 | — | — |
| Oligosugar alcohols (HG$_3$ and above) | 38.5 | — | — |
| Citric acid | 1.25 | 1.25 | 1.25 |
| Sodium Citrate | 0.5 | 0.5 | 0.5 |
| Lemon Lime Essence | 1.0 | 1.0 | 1.0 |
| Carbonated Water | (Up to a total volume of 1 liter) | | |

The carbonated lemon lime beverages obtained were evaluated by a sensory test performed by a panel of 10 members in accordance with the two point comparison method, using Control Sample 1 (sucrose-containing sample) as a control. Results obtained are shown in Table 4.

TABLE 4

| Sample | Initial Sweetness | Richness of Sweetness | Aftertaste | Overall Rating |
|---|---|---|---|---|
| Product of the Invention | +0.2 | +0.2 | −0.2 | 7.2 |
| Control Sample 1 | −1.5 | −2.0 | +1.8 | 4.8 |
| Control Sample 1 | 0 | 0 | 0 | 7.0 |

The beverages obtained were evaluated by the same rating as in Experiment (Table 2) described hereinabove. It will be recognized that the quality of the sweetness of aspartame could be markedly improved by the combined used of the three ingredients: sorbitol, maltitol and oligosugar alcohols (HG$_3$ and above).

EXAMPLE 2

Table Sweetener (granules)

TABLE 5

| Ingredients | Product of the Invention | Control Sample |
|---|---|---|
| Aspartame | 1.8 | 1.9 |
| Sorbitol | 3.0 | — |
| Maltitol | 49.1 | 98.1 |
| Oligosugar alcohols (HG$_3$ and above) | 46.1 | — |

Granules of table sweeteners (moisture content: less than 1%) were prepared from the ingredients shown in Table 5, thereby using water as a binder. The product according to the invention had a sweetness degree of 4 (i.e., the sweetness of 1 g of the product according to the invention corresponded to that of 4 g of sucrose). The two kinds of sugar granules obtained were separately added to coffee, tea, and plain yoghurt in an amount of 1.5 g/100 ml each and evaluated by a sensory test of a panel of 15 members using sucrose as a control. Results obtained are shown in Table 6.

TABLE 6

| Sample | Initial Sweetness | Richness of Sweetness | Aftertaste | Overall Rating |
|---|---|---|---|---|
| Coffee | | | | |
| Product of the Invention | +0.4 | +0.2 | −1.2 | 7.4 |
| Control Sample | −1.6 | −1.4 | −0.8 | 5.2 |
| Tea | | | | |
| Product of the Invention | +0.6 | +0.8 | −0.4 | 6.8 |
| Control Sample | −1.2 | −1.6 | +1.6 | 4.8 |
| Plain Yoghurt | | | | |
| Product of the Invention | +0.2 | +0.4 | −0.2 | 7.2 |
| Control Sample | −0.4 | −0.2 | +0.2 | 5.6 |

The samples were evaluated by the same rating as in Experiment (Table 2). It will be understood that the quality of the sweetness of aspartame could be markedly improved by using aspartame in combination with the three ingredients: sorbitol, maltitol and oligosugar alcohols (HG$_3$ and above).

In cases where aspartame is to be used as a sweetener, in particular as a liquid sweetener, the sugar alcohols according to the present invention can be heated before being admixed with aspartame. Such a liquid sweetener is capable of maintaining a high concentration of aspartame even after being cooled to room temperature and, therefore, possesses a strong sweetness of superior quality. In such a case, the sugar alcohols can be preheated to a temperature of 50° to 110° C., preferably 60° to 90° C. When the temperature is lower than 50° C., part of aspartame may remain undissolved, and when it is above 110° C., decomposition of aspartame may take place. The concentration of aspartame in said liquid sweetener can be preferably from 0.3% by weight (degree of sweetness: ca. 1.0) to 0.8% by weight (degree of sweetness: ca. 2.0). When it is less than 0.3% by weight, there may be caused diarrhea, and when it is more than 0.8% by weight, an inferior quality of sweetness may result.

In order to further improve its quality of sweetness, the sweetener or sweetened food of the present invention can be additionally incorporated with sodium salts of organic acids, such as sodium tartrate, sodium malate and sodium citrate. Such organic acid salts can be used in an amount of from 30 to 300% by weight, preferably from 30 to 200% by weight. When the quality of sweetness of the solutions containing 0.05 g of aspartame and 0.05 g or 0.0002 mol/dl of sodium salts of three organic acids were organoleptically evaluated by a panel of 12 members, sodium tartrate received the highest mark, followed by sodium malate.

EXAMPLE 3

Juice-containing Soft Beverage

TABLE 7

| Ingredients | Product of the Invention | Control Sample 1 | Control Sample 2 |
|---|---|---|---|
| Sucrose | — | 115.0 g | — |
| Aspartame | 0.40 g | — | 0.56 g |
| Sorbitol (HG$_1$) | 1.0 | — | — |
| Maltitol (HG$_2$) | 13.0 | — | — |
| Other/Oligo-sugar alcohols (HG$_3$ and above) | 11.0 | — | — |
| Citric Acid | 2.4 | 2.4 g | 2.4 |
| Sodium Citrate | 0.5 | 0.5 | 0.5 |
| Vitamin C | 0.2 | 0.2 | 0.2 |
| Concentrated | 20.0 | 20.0 | 20.0 |

TABLE 7-continued

| Ingredients | Product of the Invention | Control Sample 1 | Control Sample 2 |
|---|---|---|---|
| Orange Juice (1/5) | | | |
| Orange Essence | 1.0 | 1.0 | 1.0 |
| Water | (Up to a total weight of 1,000 g) | | |

Three kinds of juice-containing beverages were prepared from the ingredients shown in Table 7. The beverages obtained were organoleptically evaluated by a panel of 20 members in accordance with the two point comparison method, using Control Sample 1 (sucrose-containing sample) as a control. Results obtained are shown in Table 8.

TABLE 8

| Sample | Initial Sweetness | Richness of Sweetness | Aftertaste | Overall Rating |
|---|---|---|---|---|
| Product of the Invention | −0.2 | −0.2 | −0.6 | 5.8 |
| Control Sample 2 | −1.2 | −1.8 | +0.8 | 4.8 |
| Control Sample 1 | 0 | 0 | 0 | 5.6 |

(In this test was used the same rating as in EXPERIMENT)

It can be seen that the quality of the sweetness of aspartame could be improved by using it in combination with sorbitol, maltitol and the "other oligosugar alcohols" ($HG_3$ and above).

EXAMPLE 4

A liquid sweetener (A) was prepared from the following ingredients.

| Sugar alcohols* | 100 g |
|---|---|
| Aspartame | 0.35 g |
| Sodium tartrate | 0.4 g |

[Note]
*A mixture of sorbitol:maltitol:"other oligo alcohols" = 3:50:45 (based on weight)

In the above preparation, the sugar alcohols were heated to about 80° C. and admixed with aspartame and sodium tartrate by using a mixer.

The thus obtained liquid sweetener was clear. When added to coffee and tea, the sweetener was capable of imparting a satisfactory sweetness to both of them.

EXAMPLE 5

| Sugar alcohols* | 100 g |
|---|---|
| Aspartame | 0.85 g |
| Sodium Tartrate | 0.6 g |

[Note]
*A mixture of sugar alcohols having the same composition as the one used in Example 4.

A liquid sweetner (B) was prepared from the above ingredients in the same manner as in Example 4, except that the sugar alcohols were heated to a temperature of about 90° C. before being admixed. When this sweetener was allowed to stand at room temperature, there was formed a small amount of precipitate or gel of aspartame. However, it was usable as a liquid sweetener in either case. When added to coffee, the sweetener gave a satisfactory sweetness to the coffee as in the case of Example 4.

What is claimed is:

1. A sweetener for foods, which comprises aspartame, in combination with:
   1–10 wt.% sorbitol,
   45–55 wt.% maltitol, and
   35–55 wt.% of fractions obtained by reducing dextrin, said fractions having 3 or more sugar units,
   wherein said wt.%'s are each based on the combined weight of said sorbitol, maltitol and said fractions obtained by reducing dextrin,
   wherein aspartame is contained in an amount such that the weight ratio of the combined sweetness of said sorbitol, maltitol and fractions obtained by reducing dextrin to the sweetness of said aspartame is 0.5:9.5 to 3:7, wherein the sweetness corresponds to an aqueous 10 g/dl sucrose solution.

* * * * *